(12) United States Patent
Otsuka

(10) Patent No.: US 9,691,362 B2
(45) Date of Patent: Jun. 27, 2017

(54) DISPLAY CONTROL APPARATUS, DISPLAY CONTROL METHOD, AND RECORDING MEDIUM DISPLAYING FRAMES INDICATING PORTIONS OF AN IMAGE

(71) Applicant: Sony Corporation, Tokyo (JP)

(72) Inventor: Yoshihiro Otsuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 13/767,936

(22) Filed: Feb. 15, 2013

(65) Prior Publication Data

US 2013/0222421 A1 Aug. 29, 2013

(30) Foreign Application Priority Data

Feb. 24, 2012 (JP) .................. 2012-038213

(51) Int. Cl.
*G09G 5/14* (2006.01)
*G09G 5/377* (2006.01)
(52) U.S. Cl.
CPC ............... *G09G 5/377* (2013.01); *G09G 5/14* (2013.01); *G06F 2203/04806* (2013.01); *G09G 2340/045* (2013.01); *G09G 2340/12* (2013.01)
(58) Field of Classification Search
None
See application file for complete search history.

(56) References Cited

U.S. PATENT DOCUMENTS

| 2004/0250216 A1* | 12/2004 | Roman ................. G06F 3/0481 715/800 |
| 2006/0087520 A1* | 4/2006 | Ito ....................... G06F 3/0481 345/660 |
| 2009/0290046 A1* | 11/2009 | Kita ................... H04N 5/23222 348/231.99 |
| 2010/0289825 A1* | 11/2010 | Shin ..................... G06F 3/04845 345/667 |
| 2012/0236027 A1 | 9/2012 | Ogata |
| 2013/0321459 A1 | 12/2013 | Hayakawa et al. |

FOREIGN PATENT DOCUMENTS

| JP | 3534101 B2 | 3/2004 |
| JP | 2011-229172 A | 11/2011 |

OTHER PUBLICATIONS

U.S. Appl. No. 13/514,330, filed Jun. 7, 2012, Ogata.
U.S. Appl. No. 13/984,672, filed Aug. 9, 2013, Hayakawa et al.

* cited by examiner

*Primary Examiner* — Barry Drennan
*Assistant Examiner* — Diana Hickey
(74) *Attorney, Agent, or Firm* — Chip Law Group

(57) ABSTRACT

A display control apparatus configured to perform display control in a manner that a first frame indicating a region to be digitally zoomed in an input image and a second frame indicating a region to be enlarged in the input image are superimposed on the input image. A display control method including performing display control in a manner that a first frame indicating a region to be digitally zoomed in an input image and a second frame indicating a region to be enlarged in the input image are superimposed on the input image. A computer-readable recording medium having an image processing program recorded therein, the image processing program causing a computer to perform the display control method.

11 Claims, 9 Drawing Sheets

FIG. 8
A
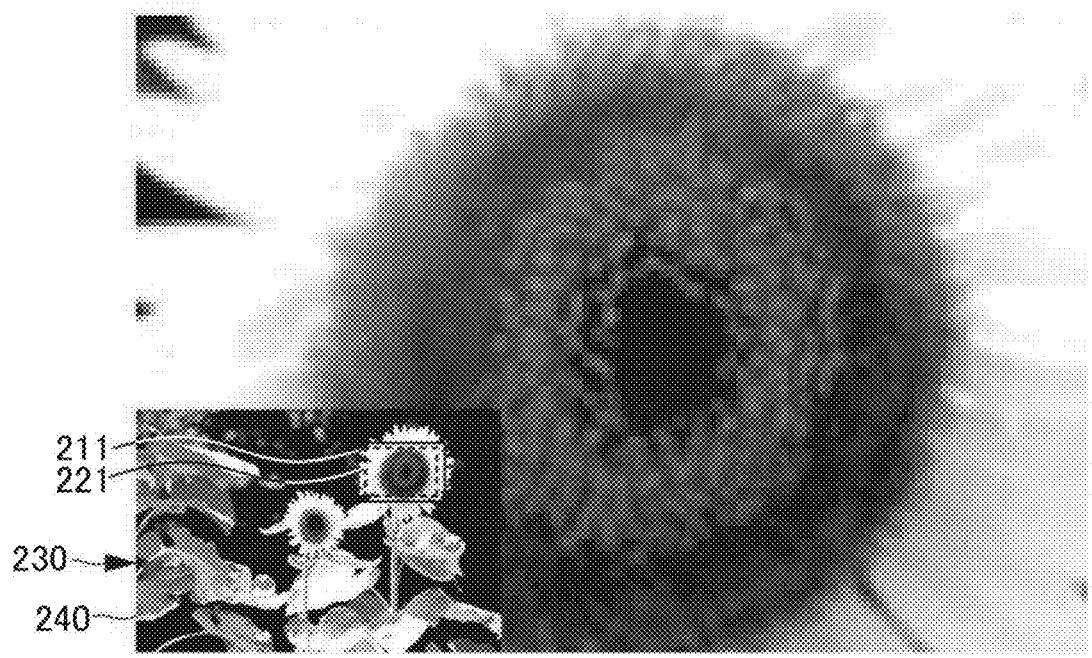
B
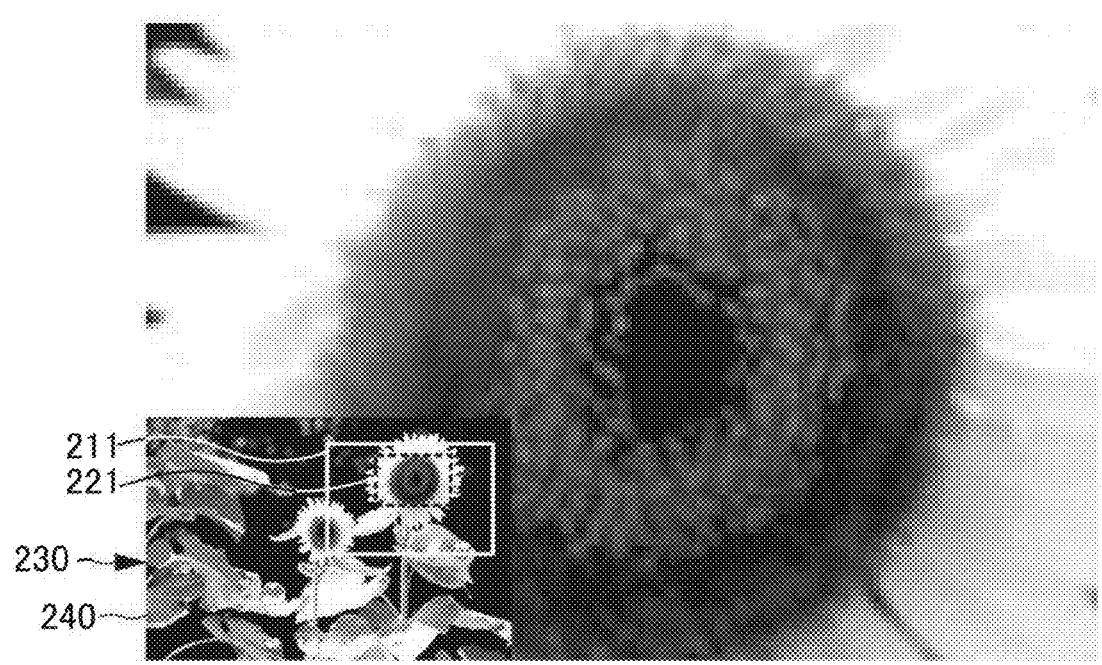

FIG. 9
A
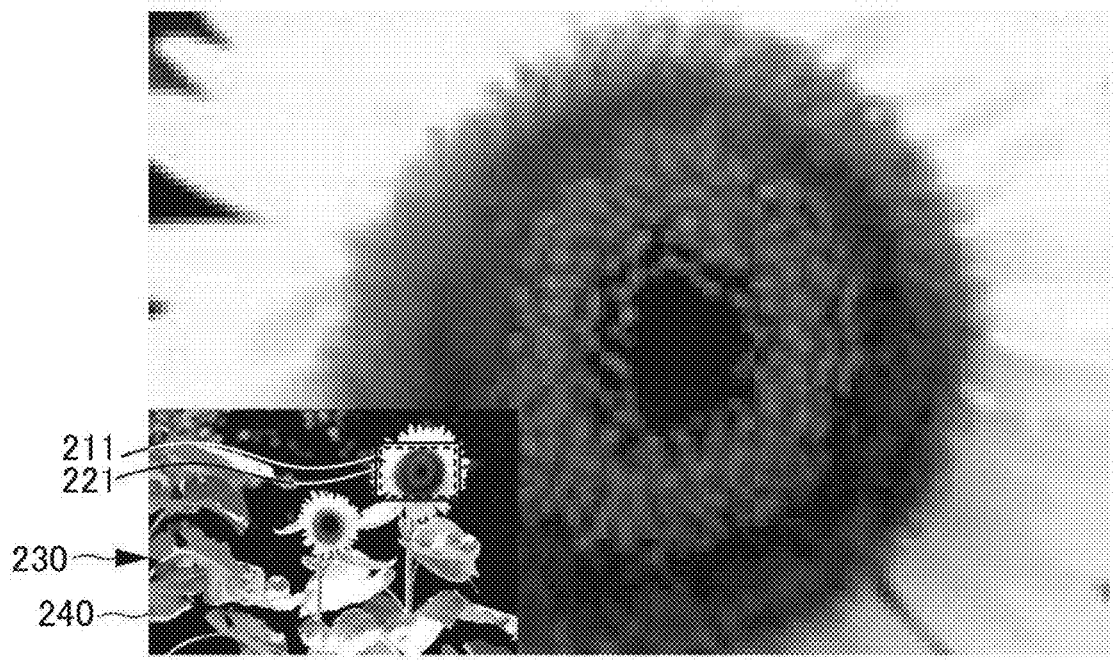
B
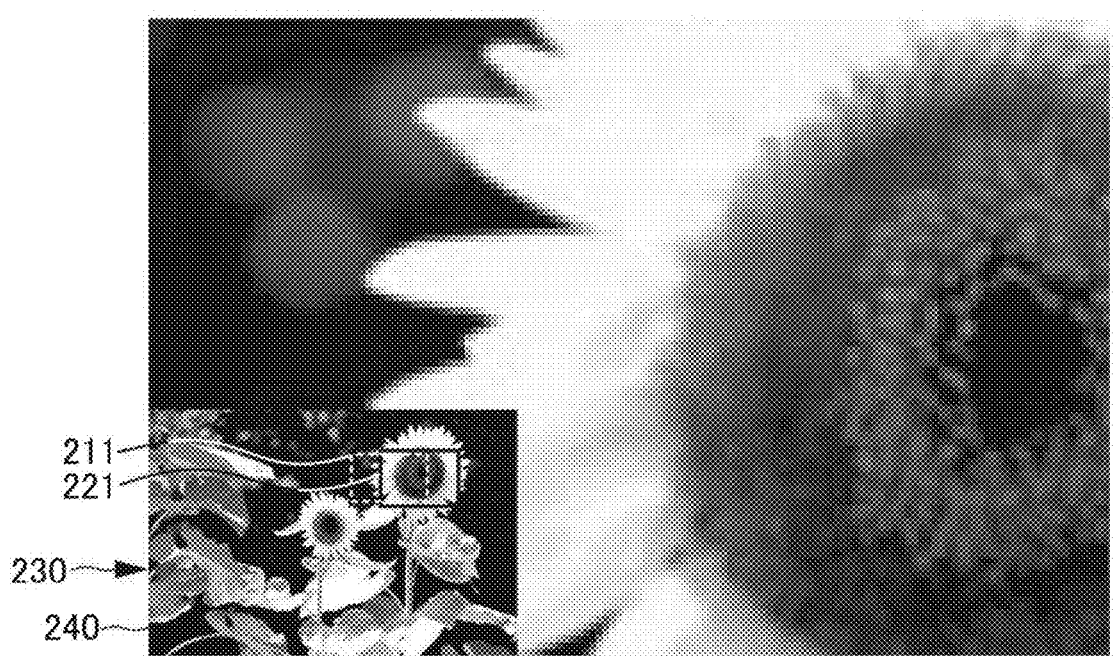

DISPLAY CONTROL APPARATUS, DISPLAY CONTROL METHOD, AND RECORDING MEDIUM DISPLAYING FRAMES INDICATING PORTIONS OF AN IMAGE

BACKGROUND

The present technology relates to a display control apparatus, a display control method, and a recording medium.

In general, imaging devices display a region to be imageable at the digital zoom time as a through image on a display device such as a panel and do not display a non-imaging region other than a region to be digitally zoomed on the panel. Accordingly, at the time of digital zoom, a status of the non-imaging region may not be observable on the panel.

On the other hand, in a mode in which a focal position is displayed at an optimally displayable fixed magnification to adjust focus, a designated display position is enlarged and displayed at a fixed magnification, irrespective of a digital zoom magnification.

Accordingly, a technology for expressing a relative relation between an imageable region and a digital zoom region using frames displayed on a through image is proposed (see Japanese Unexamined Patent Application Publication No. 2011-229172).

On the other hand, a technology for expressing which region is focused and enlarged at the non-digital zoom time is also proposed (see Japanese Patent No. 3534101).

SUMMARY

According to the technology disclosed in Japanese Unexamined Patent Application Publication No. 2011-229172, the relative relation between the imageable region and the digital zoom region is expressed by displaying frames on a through image. However, it is not expressed which region is enlarged, when partial enlargement is performed.

Further, according to the technology disclosed in Japanese Patent No. 3534101, it is expressed which region is partially enlarged at the non-digital zoom time. However, a positional relation between a region to be imageable at the digital zoom time and a region to be partially enlarged is not expressed.

It is desirable to provide a display control apparatus, a display control method, and a recording medium capable of explicitly expressing a relation between a region to be enlarged through digital zoom and a region to be partially enlarged.

According to an embodiment of the present technology, there is provided a display control apparatus configured to perform display control in a manner that a first frame indicating a region to be digitally zoomed in an input image and a second frame indicating a region to be enlarged in the input image are superimposed on the input image.

According to another embodiment of the present technology, there is provided a display control method including performing display control in a manner that a first frame indicating a region to be digitally zoomed in an input image and a second frame indicating a region to be enlarged in the input image are superimposed on the input image.

According to still another embodiment of the present technology, there is provided a computer-readable recording medium having an image processing program recorded therein, the image processing program causing a computer to perform a display control method including performing display control in a manner that a first frame indicating a region to be digitally zoomed in an input image and a second frame indicating a region to be enlarged in the input image are superimposed on the input image.

According to the embodiments of the present technology, the relation between a region to be enlarged through digital zoom and a region to be partially enlarged can be explicitly expressed.

BRIEF DESCRIPTION OF THE DRAWINGS

FIG. 8A is a diagram illustrating an enlarged display screen;

FIG. 8B is a diagram illustrating a state in which an indicator of the enlarged display screen is changed;

FIG. 9A is a diagram illustrating an enlarged display screen; and

FIG. 9B is a diagram illustrating an enlarged display screen in which an enlarged region is moved.

DETAILED DESCRIPTION OF THE EMBODIMENTS

Figure 1:
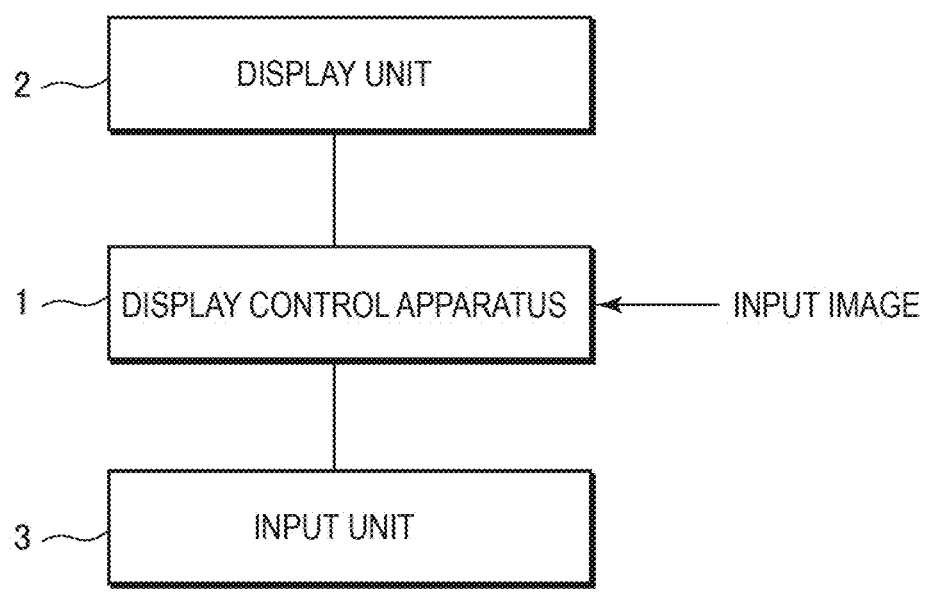
FIG. 1 is a block diagram illustrating the configuration of a display control apparatus according to a first embodiment of the present technology.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Hereinafter, the embodiments of the present technology will be described with reference to the drawings. However, embodiments of the present technology are not limited to the embodiments to be described below. The description will be made in the following order.

<1. First Embodiment>
[1-1. Configuration of Display Control Apparatus]
[1-2. Configuration of Imaging Device Having Function of Display Control Apparatus]
[1-3. Display Control Process]
<2. Second Embodiment>
[2-1. Display Control Process]
<3. Modification Examples>

1. First Embodiment

[1-1. Configuration of Display Control Apparatus]

FIG. 1 is a block diagram illustrating the configuration of a display control apparatus 1 according to an embodiment of the present technology. For example, the display control apparatus 1 is mounted on an electronic device such as an imaging device such as a digital still camera or a digital video camera, or a smart phone, a cellular phone, or a portable game device having a camera function. The display control apparatus 1 is used when an image or a video is imaged.

For example, the display control apparatus 1 is realized by executing a predetermined program using a central processing unit (CPU), a random access memory (RAM), a read-only memory (ROM), and the like. The ROM stores a program or the like that is read by the CPU to operate. The RAM is used as a work memory of the CPU. The CPU executes a function of a display control apparatus by executing various processes in accordance with a program stored in the ROM and issuing commands.

Here, the display control apparatus 1 is realized not only by a program but also by a dedicated device of hardware having the function of the display control apparatus.

The display control apparatus 1 is connected to an external display unit 2 and controls display of the display unit 2. Image data displayed on the display unit 2 is input from the outside to the display control apparatus 1. The display control performed by the display control apparatus 1 will be described in detail below. The display unit 2 is, for example, a display unit that displays a through image, a captured image, a moving image, various setting screens, or the like in an imaging device. Examples of the display unit 2 include a liquid crystal display (LCD), a plasma display panel (PDP), and an organic electro-luminescence (EL) panel.

The display control apparatus 1 is connected to an external input unit 3. Examples of the input unit 3 include a release button used to give an instruction to start recording a captured image, an operator for zoom adjustment, a touch screen integrally configured with a display unit, and various buttons installed in the imaging device. When an input to the input unit 3 is performed, a control signal according to the input is generated and output to the display control apparatus 1. The display control apparatus performs display control in accordance with the control signal. Thus, the display control apparatus 1 receives various inputs via the input unit 3.

[1-2. Configuration of Imaging Device Having Function of Display Control Apparatus]

Figure 2:
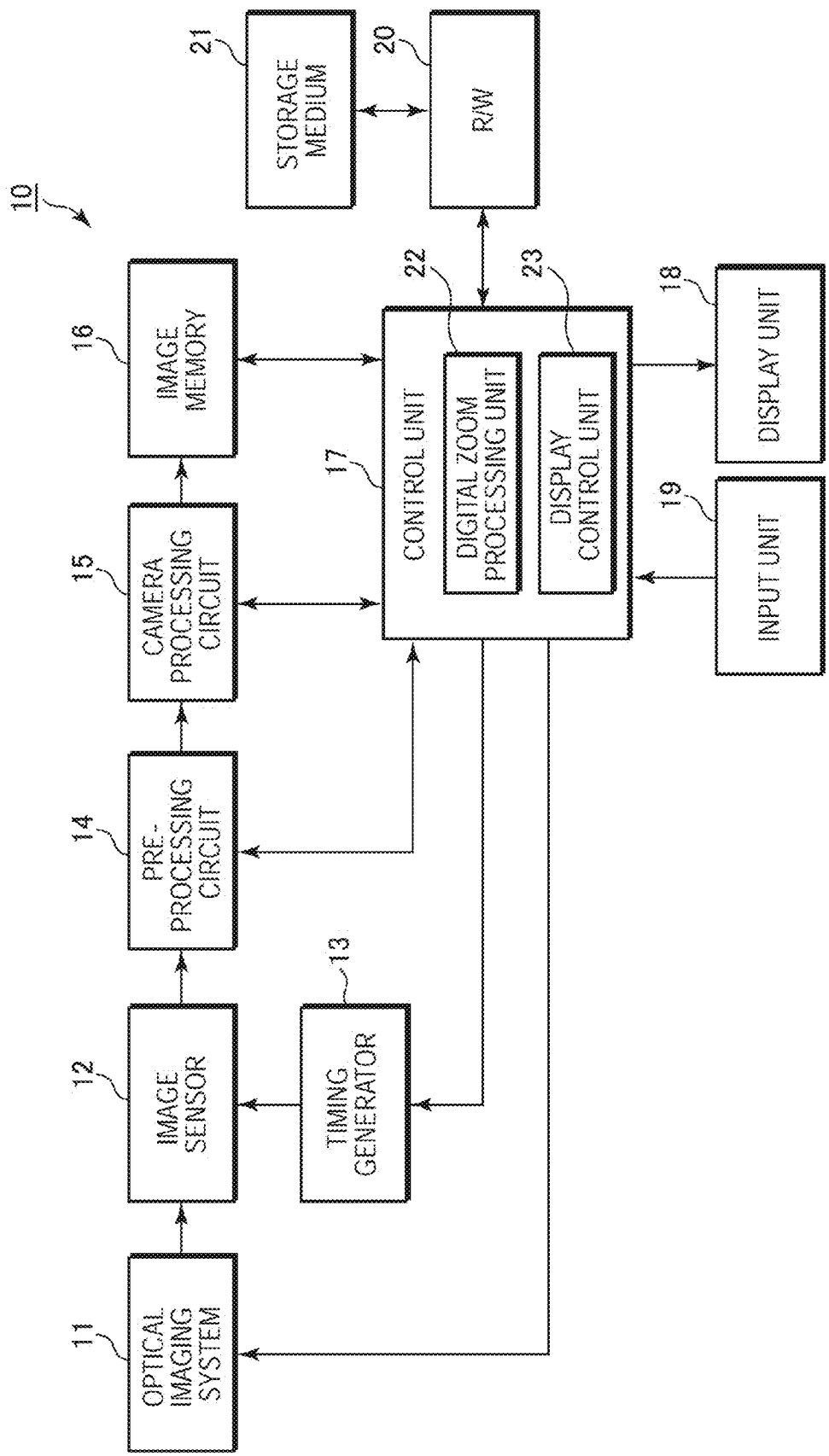
FIG. 2 is a block diagram illustrating the configuration of an imaging device including the display control apparatus.

Hereinafter, an example of the configuration of the imaging device 10 having the function of the above-described display control apparatus 1 will be described. FIG. 2 is a block diagram illustrating the overall configuration of the imaging device 10.

The imaging device 10 includes an optical imaging system 11, an image sensor 12, a timing generator 13, a pre-processing circuit 14, a camera processing circuit 15, an image memory 16, a control unit 17, a display unit 18, an input unit 19, a reader/writer (R/W) 20, and a storage medium 21. The optical imaging system 11, the timing generator 13, the pre-processing circuit 14, the camera processing circuit 15, the image memory 16, the input unit 19, and the R/W 20 among these constituent elements are connected to the control unit 17. The control unit 17 functions as a digital zoom processing unit 22 and a display control unit 23 by executing predetermined programs. The display control unit 23 corresponds to the display control apparatus 1 in FIG. 1. Further, the display unit 18 corresponds to the display unit 2 in FIG. 1. The input unit 19 corresponds to the input unit 3 in FIG. 1.

The optical imaging system 11 includes a lens that condenses light from a subject to the image sensor 12, a driving mechanism that performs focus or zooming by moving the lens, a shutter mechanism, and an iris mechanism. These constituent elements are driven based on control signals from the control unit 17. An optical image of the subject obtained through the optical imaging system 11 is formed on the image sensor 12 serving as an imaging device.

The image sensor 12 is driven based on a timing signal output from the timing generator 13, photoelectrically converts incident light from the subject into an amount of charge, and outputs the amount of charge as an analog imaging signal. The analog imaging signal output from the image sensor 12 is output to the pre-processing circuit 14. Examples of the image sensor 12 include a charge coupled device (CCD) and a complementary metal oxide semiconductor (CMOS). The timing generator 13 outputs a timing signal to the image sensor 12 under the control of the control unit 17.

The pre-processing circuit 14 samples and holds the analog imaging signal output from the image sensor 12 so that a signal/noise (S/N) ratio can be maintained satisfactorily through correlated double sampling (CDS). Further, the pre-processing circuit 14 performs analog-to-digital (A/D) conversion by controlling a gain obtained through an auto gain control (AGC) process and outputs a digital image signal.

The camera processing circuit 15 performs signal processing, such as a white balance adjustment process, a color correction process, a gamma correction process, a Y/C conversion process, and an auto-exposure (AE) process, on the image signal from the pre-processing circuit 14.

The image memory 16 is a volatile memory such as a buffer memory that includes a dynamic random access memory (DRAM) and temporarily stores image data subjected to predetermined processes by the pre-processing circuit 14 and the camera processing circuit 15.

The control unit 17 includes, for example, a CPU, a RAM, and a ROM. The ROM stores a program or the like that is read by the CPU to operate. The RAM is used as a work memory of the CPU. The CPU controls the entire imaging device 10 by executing various processes in accordance with a program stored in the ROM and issuing commands. Further, the control unit 17 functions as the digital zoom processing unit 22 and the display control unit 23 by executing predetermined programs.

The control unit 17 transmits a control signal to the optical imaging system 11 and performs a focus process by operating the driving mechanism when a user inputs a focusing operation to the input unit 20.

The digital zoom processing unit 22 performs a process of enlarging a region designated by the user in an image acquired by the image sensor 12 and subjected to a predetermined process by the camera processing circuit 15 or the like. Digital zoom is a function of cutting and enlarging a part of the optically acquired image through a digital process. The digitally zoomed image can be displayed as a through image on the display unit. When the user performs a release operation in the digitally zoomed state, the digitally zoomed image is stored as a captured image.

The display control unit 23 performs display control in the display unit 18, as described above with reference to FIG. 1. An image acquired by the image sensor 12 and subjected to a predetermined process by the camera processing circuit 15 or the like is input as input image data to the display control unit 23.

The display unit 18 is an image display unit such as an LCD, a PDP, or an organic EL panel. The display unit receives an image signal supplied from the control unit 17 and displays a through image being subjected to an imaging process, an image recorded in the storage medium 21, various setting screens, or the like under the control of the display control unit 23.

The input unit 19 is an input unit such as a power button used to turn on and off the power, a release button used to give an instruction to start recording a captured image, an operator for zoom adjustment, and a touch screen integrally configured with the display unit 18. When an input to the input unit 19 is performed, a control signal suitable for the input is generated and output to the control unit 17. Further, the control unit 17 performs an arithmetic process or control corresponding to the control signal.

In this embodiment, the display control unit 23 receives an input from the user, such as a digital zoom magnification, designation of a digital zoom region, proceeding to an enlargement region designation mode, designation of the position of the enlargement region, or determination of the enlargement region via the input unit 19.

The R/W 20 is an interface to which the recording medium 22 recording image data or the like generated through the imaging process is connected. The R/W 20 writes data supplied from the control unit 17 in the storage medium 21 and outputs data read from the storage medium 21 to the control unit 17. The storage medium 21 is, for example, a large-capacity storage medium such as a hard disk, a memory stick (registered trademark of Sony Corporation), or an SD memory card. An image is stored in a compressed state in conformity with, for example, the JPEG standard. Further, information regarding a stored image and exchangeable image file format (EXIF) data including additional information such an imaging date are also stored in correspondence with the image.

[1.3. Display Control Process]

Figure 3:
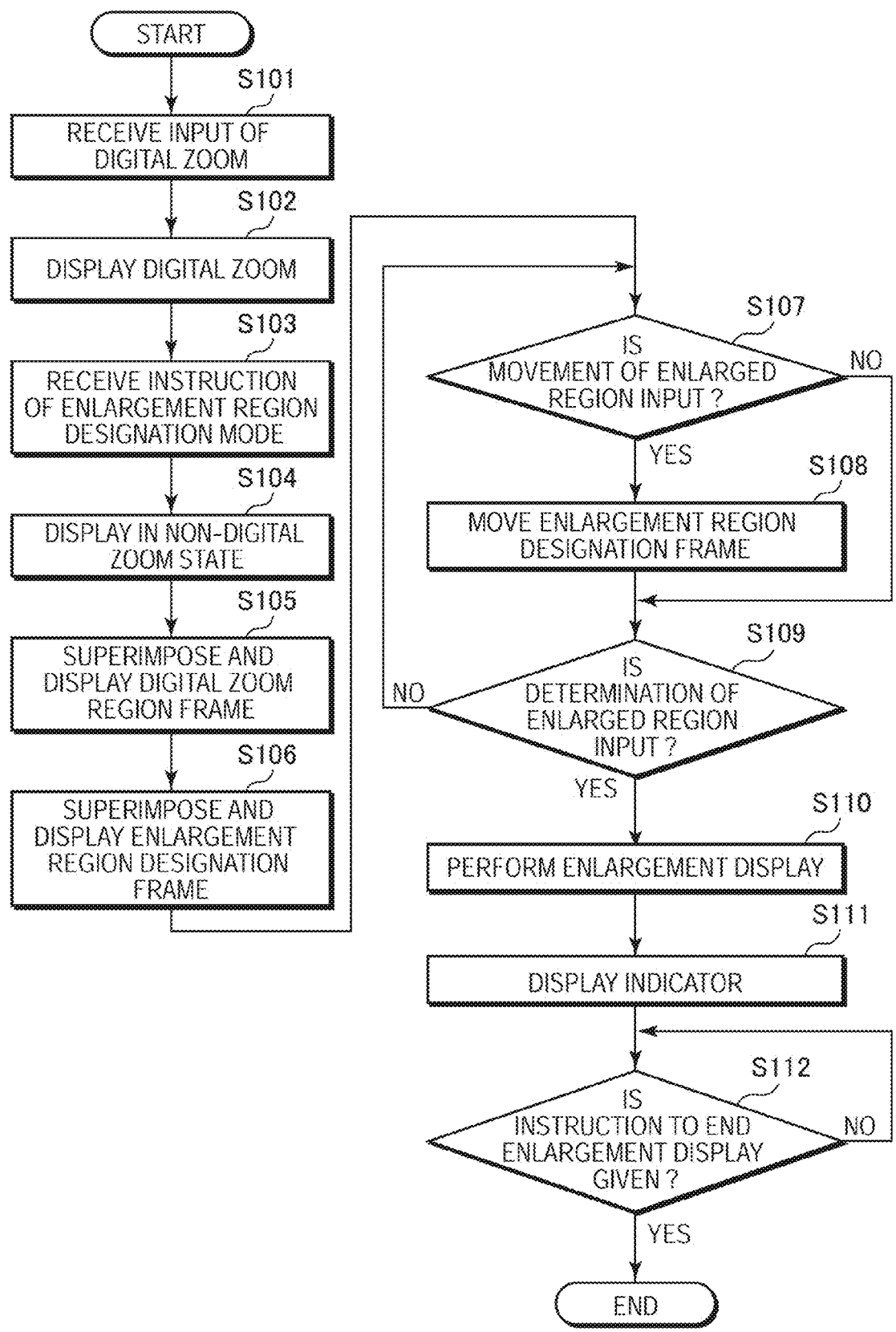
FIG. 3 is a flowchart illustrating a flow of a display control process performed by the display control apparatus.

Next, a process performed by the display control unit 23 will be described with reference to FIGS. 3 and 4A to 4D. FIG. 3 is a flowchart illustrating a flow of the process performed by the display control unit 23. FIGS. 4A to 4D are diagrams illustrating a specific example of display performed by the display control unit 23. The description will be made giving an example in which the display control unit 23 is mounted on the imaging device 10 shown in FIG. 2 and the process performed by the display control unit 23 is performed in the imaging device 10.

When the process starts, as shown in FIG. 4A, the display unit 18 is assumed to display a subject as a through image in a non-digital zoom state (a magnification of 1.0 time). First, in step S101, the input unit 19 receives a user's operation of inputting digital zoom.

When the operation of inputting the digital zoom is performed, the digital zoom processing unit 22 performs a digital zoom process. Then, in step S102, the display control unit 23 causes the display unit 18 to display the digitally zoomed image as a through image, as shown in FIG. 4B. The user can determine an angle of view, a composition, a subject or the like to be included in the image by confirming the digitally zoomed subject on the through image.

Next, in step S103, the display control unit 23 receives an instruction to proceed to the enlargement region designation mode from the user via the input unit 19. Next, in step S104, the display control unit 23 sets the display of the through image to enter the non-digital zoom state (a magnification of 1.0 time), as shown in FIG. 4C. Then, in step S105, a frame (hereinafter referred to as a digital zoom region frame 110) indicating a region to be digitally zoomed is superimposed and displayed on the image displayed as the through image, as a frame indicated by a solid line is shown in FIG. 4C. The digital zoom region frame 110 corresponds to a "first frame" in the claims.

Thus, the user can comprehend the size, position, and the like of a region to be enlarged through the digital zoom, and simultaneously, can also comprehend a state of a non-imaging region other than the region to be enlarged through the digital zoom, viewing the through image.

Further, in the enlargement region designation mode, the display control unit 23 superimposes and displays a frame (hereinafter referred to as an enlargement region designation frame 120) in which an enlargement region is designated on an image displayed as the through image in step S106. In FIG. 4C, the enlargement region designation frame 120 is indicated by a dashed line. The enlargement region designation frame 120 corresponds to a "second frame" in the claims.

The enlargement region designation frame 120 can be moved to any position within the digital zoom region frame 110 in response to a user's operation received by the input unit 19.

The digital zoom region frame 110 and the enlargement region designation frame 120 may be distinguished from each other visually easily by painting with different colors.

Next, when a user's instruction to move the enlargement region designation frame 120 is received via the input unit 19 in step S107, the process proceeds to step S108 (Yes in step S107). Then, in step S108, the display control unit 23 moves the enlargement region designation frame 120 in accordance with the contents of this instruction.

In the through image, a region other than the digital zoom region frame 110 is a non-imaging region which is not contained in an image, even when imaging is performed. The inside of the digital zoom region frame 110 is an imaging region which is contained in the image and is a region in which the enlargement region designation frame 120 is enlarged and displayed.

Next, the process proceeds to step S109. Even when the movement of the enlargement region designation frame 120 is not input by the user via the input unit 19 in step S107 described above, the process proceeds to step S109 (No in step S107).

Next, in step S109, when an input of a user's instruction to determine the enlargement region is received via the input unit 19, the process proceeds to step S110 (Yes in step S109).

Next, in step S110, as shown in FIG. 4D, the display control unit 23 enlarges the region inside the enlargement region designation frame 120 of the image up to the size of the through image and displays the enlarged region on the display unit 18. The enlarged display screen is realized, for example, by performing the digital zoom on the inside of the enlargement region designation frame 120 of the image.

On the enlarged display screen, a subjected desired by the user is largely displayed on the display unit 18. The enlarged display screen can be used to assist the user in imaging. For example, the user can accurately focus the desired subject by performing a focus operation viewing the enlarged display screen.

Further, on the enlarged display screen, in step S111, the display control unit 23 superimposes and displays an indicator 130 indicating a positional relation between the digital zoom region frame 110 and the enlargement region designation frame 120 in a portion (the left lower portion in FIG. 4D) of the through image. The indicator 130 includes a first small frame 111 corresponding to the digital zoom region frame 110 and a second small frame 121 corresponding to the enlargement region designation frame 120. In FIG. 4D, the first small frame 111 is shown by a solid line and the second small frame 121 is shown by a dashed line.

The relation of the position and the size between the first small frame 111 and the second small frame 121 corresponds to the relation of the position and size between the digital zoom region frame 110 and the enlargement region designation frame 120. That is, the relation between the digital zoom region frame 110 and the enlargement region designation frame 120 is shown by the small sizes of the first small frame 111 and the second small frame 121.

Even on the enlarged display screen, the display control unit 23 may receive an instruction to move the enlargement region designation frame 110 via the input unit 19. On the enlarged display screen, when the input unit 19 receives an instruction to move the enlargement region, the display control unit 23 moves the display of the enlargement region in the through image in response to the input of the user. Thus, the region to be enlarged and displayed can be changed.

On the enlarged display screen, when an input of an instruction to move the enlargement region is received via the input unit 19, the display control unit 23 may move the position of the second small frame 121 in the indicator 130. Thus, the user can easily comprehend the relative positional relation between the digital zoom region and the enlargement region, even when the digital zoom region frame 110 and the enlargement region designation frame are not displayed. Further, the position of the first small frame 111 indicating the digital zoom region is fixed in the indicator 130.

Next, when an instruction to end the enlargement display is received from the user via the input unit 19 in step S112, the process performed by the display control unit 23 ends (Yes in step S112). Further, when the instruction to end the enlargement and display is given, the imaging is performed in the imaging device 10 and an image in the digital zoom state shown in FIG. 4B may be acquired as a captured image.

When the enlarged display screen is used for a focus operation and the user performs a release operation on the imaging device 10 at the focused time, the imaging device 10 may perform imaging directly. Here, when the user determines that focus is achieved and inputs an instruction to determine the focus on the enlarged display screen, a display state may once return to the digital zoom display state shown in FIG. 4B and the user may confirm the digital zoom state in the through image. In this case, the user performs the release operation to perform the imaging, after confirming the digital zoom state.

FIGS. 5A to 5D are diagrams illustrating a second specific example of the display control performed by the display control unit 23.

Figure 5:
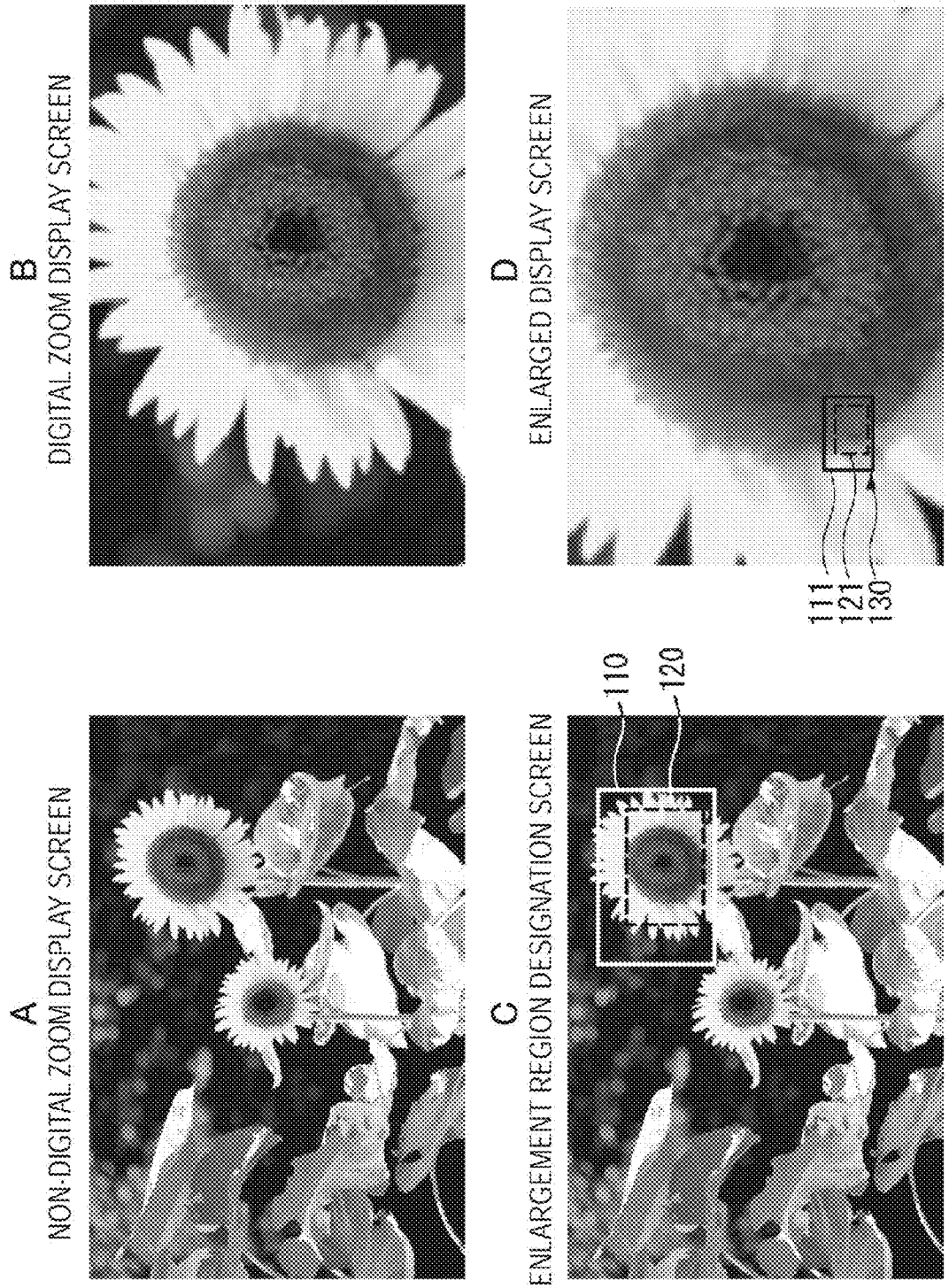
FIG. 5A is a diagram illustrating a non-digital zoom display screen in a second specific example of the display control.
FIG. 5B is a diagram illustrating a digital zoom display screen.
FIG. 5C is a diagram illustrating an enlargement region designation screen.
FIG. 5D is a diagram illustrating an enlarged display screen.

FIG. 5A is a diagram illustrating a state in which a subject is displayed as a through image on the display unit 18 in a non-digital zoom state (magnification of 1.0 time). When the user operates the input unit 19 to input digital zoom, the display control unit 23 displays a digitally zoomed image as a through image on the display unit 18, as shown in FIG. 5B.

Next, when the display control unit 23 receives an input of an instruction to proceed to the enlargement region designation mode via the input unit 19, the display control unit 23 sets the display of the through image to enter the non-digital zoom state (magnification of 1.0 time), as shown in FIG. 5C. Further, the digital zoom region frame 110 indicating the region to be digitally zoomed is superimposed and displayed on the through image. In FIG. 5C, the digital zoom region frame 100 is indicated by a solid line.

In the enlargement region designation mode, the display control unit 23 superimposes and displays the enlargement region designation frame 120 used to designate the enlargement region on the through image. In FIG. 5C, the enlargement region designation frame 120 is indicated by a dashed line. In the through image, a region other than the digital zoom region frame 110 is a non-imaging region which is not contained in an image, even when imaging is performed. The inside of the digital zoom region frame 110 is an imaging region which is contained in the image and is a region in which the enlargement region designation frame 120 is enlarged and displayed.

Figure 4:
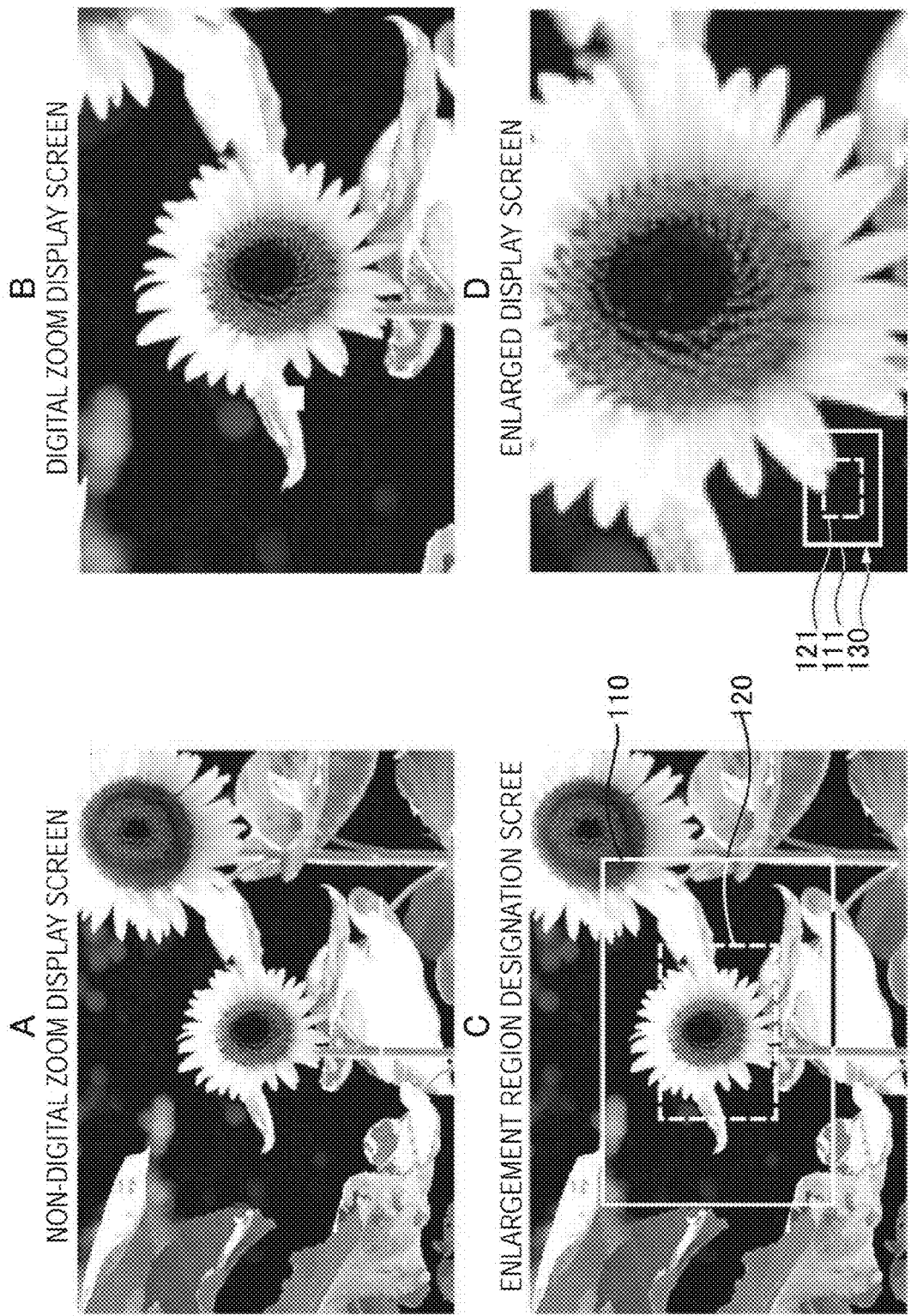
FIG. 4A is a diagram illustrating a non-digital zoom display screen in a first specific example of the display control.
FIG. 4B is a diagram illustrating a digital zoom display screen.
FIG. 4C is a diagram illustrating an enlargement region designation screen.
FIG. 4D is a diagram illustrating an enlarged display screen.

In the example shown in FIGS. 5A to 5D, the digital zoom magnification is higher than the digital zoom magnification of the example shown in FIG. 4. Therefore, in FIG. 5C, the digital zoom region frame 110 is smaller than that of FIG. 4C, and thus the sizes of the digital zoom region frame 110 and the enlargement region designation frame 120 are approximated to each other.

When the position of the enlargement region designation frame 120 is determined and the user inputs determination of the position of the enlargement region designation frame 120, as shown in FIG. 4D, the display control unit 23 enlarges the image inside the determined enlargement region designation frame 120 up to the size of the through image and displays the enlarged image. On this enlarged display screen, a subject desired by the user is largely displayed on the display unit 18. Accordingly, by performing a focus operation while viewing the through image in this state, the user can accurately focus the desired subject. The enlarged display screen is also realized by performing the digital zoom on the image of the enlargement region designation frame 120.

On the enlarged display screen, the display control unit 23 superimposes and displays the indicator 130 showing a positional relation between the digital zoom region frame 110 and the enlargement region designation frame 120 in a portion (the left lower portion in FIG. 5D) of the through image. The indicator 130 includes a first small frame 111 indicating the digital zoom region frame 110 and a second small frame 121 indicating the enlargement region designation frame. The first small frame 111 is shown by a solid line and the second small frame 121 is shown by a dashed line.

Even on the enlarged display screen, the input unit 19 can receive an instruction to move the enlargement region. When the input unit 19 receives the instruction to move the enlargement region on the enlarged display screen, the display control unit 23 moves the display of the enlargement region in the through image in response to the input of the user. Thus, the subject to be enlarged and displayed can be changed.

In response to the user's instruction to move the enlargement region on the enlarged display screen, the display control unit 23 moves the second small frame 121 in the indicator 130. Thus, the user can easily comprehend the relative positional relation between the digital zoom region and the enlargement region, even when the digital zoom region frame 110 and the enlargement region designation frame 120 are not displayed. Further, the position of the first small frame 111 indicating the digital zoom region is fixed in the indicator 130.

In the example shown in FIGS. 5A to 5D, a display range is enlarged in the non-digital zoom state (magnification of 1.0 time), as understood by comparing FIGS. 5A to 4A. Further, the digital zoom regions have similar sizes, as understood by comparing FIGS. 5B to 4B. Accordingly, the sizes of the digital zoom region frame 110 and the enlargement region designation frame 120 are further approximated to each other in FIG. 5C than in FIG. 4C.

When the digital zoom region frame 110 and the enlargement region designation frame 120 shown in FIGS. 4C and 5C are superimposed and displayed, a region to be digitally zoomed may be changed by changing the position and size of the digital zoom region frame 110.

Thus, in the first embodiment, when the user performs enlargement of an image, as described above, the user can easily comprehend which region is enlarged in the digitally zoomed region. Since the positional relation between the digital zoom region and the enlargement region is displayed by the indicator 130 on the enlarged display screen, the relative positional relation between the digital zoom region and the enlargement region can be easily comprehended at any time.

2. Second Embodiment

[2-1. Display Control Process]

Figure 6:
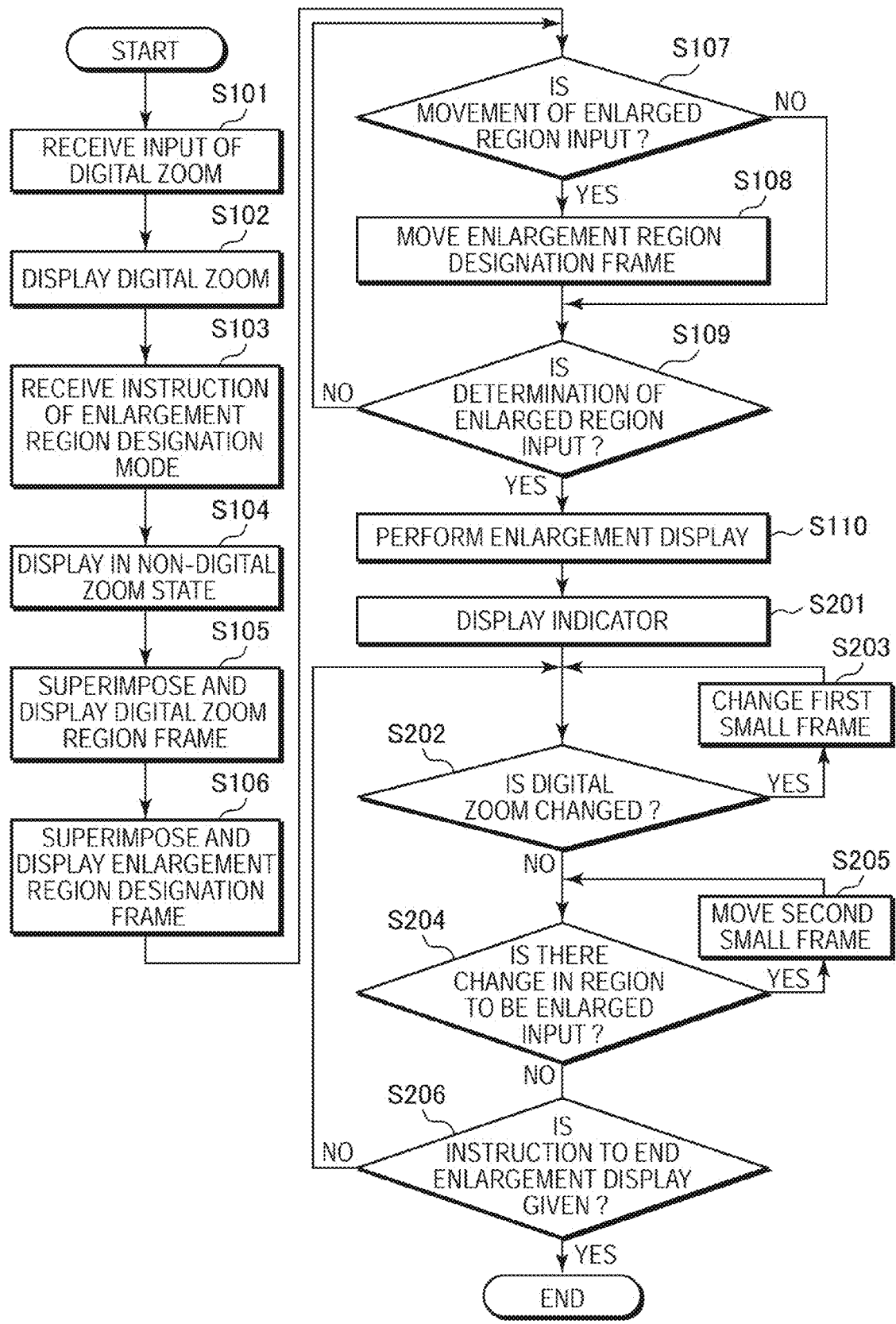
FIG. 6 is a flowchart illustrating a flow of a display control process performed by a display control apparatus according to a second embodiment of the present technology.

Next, a second embodiment of the present technology will be described. FIG. 6 is a flowchart illustrating a flow of the process performed by a display control unit 23 according to the second embodiment. FIGS. 7A to 7D are diagrams illustrating a specific example of display performed by the display control unit 23. Since the configuration of an imaging device 10 having the function of the display control apparatus is the same as that of the first embodiment, the description thereof will not be repeated.

As will be described in detail below, the second embodiment is different from the first embodiment in that a region to be digitally zoomed can be changed even on an enlarged display screen. Further, the second embodiment is also different from the first embodiment in that a reduced image is included in an indicator 230.

In the flowchart of FIG. 6, step S101 to step S110 are the same as those of the first embodiment.

When the process starts, as shown in FIG. 7A, a display unit is assumed to display a subject as a through image in a non-digital zoom state (a magnification of 1.0 time). First, when a user's operation of inputting digital zoom is received from a user via the input unit 19 in step S101, the display control unit 23 displays a digitally zoomed image as a through image on the display unit 18 in step S102, as shown in FIG. 7B.

Next, when an instruction to proceed to the enlargement region designation mode is input from the user via the input unit 19 in step S103, the display control unit 23 sets the display of the through image to enter the non-digital zoom state (a magnification of 1.0 time) in step S104, as shown in FIG. 7C. Then, in step S105, the display control unit 23 superimposes and displays a digital zoom region frame 210 on the through image. Further, in step S106, the display control unit 23 superimposes and displays an enlargement region designation frame 220 on the through image in step 106. In FIG. 7C, the digital zoom region frame 210 is indicated by a solid line and the enlargement region designation frame 220 is indicated by a dashed line.

Next, when an instruction to move the enlargement region is received from the user via the input unit 19 in step S107, the process proceeds to step S108 (Yes in step S107) and the display control unit 23 moves the enlargement region designation frame 220 in response to this instruction.

Next, the process proceeds to step S110. Even when the movement of the enlargement region designation frame 220 is not input by the user via the input unit 19 in step S108 described above, the process proceeds to step S110 (No in step S108).

Next, when an input of an instruction to determine the position of the enlargement region designation frame 220 is received from the user via the input unit 19 in step S109, the process proceeds to step S110 (Yes in step S109). Then, in step S110, the display control unit 23 enlarges the image inside the determined enlargement region designation frame 220 up to the size of the through image and displays the enlarged image, as shown in FIG. 7D.

Next, in step S201, the display control unit 23 superimposes and displays the indicator 230 indicating the positional relation between the digital zoom region frame 210 and the enlargement region designation frame 220 in a portion (the left lower portion in FIG. 7D) on the image inside the enlarged and displayed enlargement region designation frame 220. The indicator 230 includes a reduced image 240 of the through image in the non-digital zoom state (a magnification of 1.0 time), a first small frame 211 which is superimposed and displayed on the reduced image 240 and shows the digital zoom region frame 210, and a second small frame 221 which shows the enlargement region designation frame 220. In FIG. 7D, the first small frame 211 is indicated by a solid line and the second small frame 221 is indicated by a dashed line. The display control unit 23 generates the reduced image of the input image and superimposes and displays the reduced image on the image enlarged and displayed as a constituent element of the indicator 230.

Unlike the first embodiment, the indicator 230 includes the reduced image 240 of the through image in the non-digital zoom state (a magnification of 1.0 time), and the first small frame 211 and the second small frame 221 are superimposed and displayed on the reduced image 240. Thus, the indicator 230 replicates the state in which the digital zoom region frame 210 and the enlargement region designation frame 220 are superimposed and displayed on the through image in the non-digital zoom state (a magnification of 1.0 time) shown in FIG. 7C.

Thus, the user can easily comprehend which region is zoomed through the digital zoom even on the enlarged display screen. Further, the user can easily comprehend where the enlargement region is located in the digital zoom region even on the enlarged display screen.

After the indicator 230 is displayed, the process proceeds to step S202. When an instruction to change a region to be digitally zoomed is input from the user via the input unit 19 in step S202, the process proceeds to step S203 (Yes in step S202). Then, in step S203, the display control unit 23 changes the region to match a digital zoom region, in which the first small frame 211 is changed in the indicator 230, so that the state of FIG. 8A is changed to the state of FIG. 8B.

Thus, even when the enlargement region is enlarged and displayed as the through image, the user can easily comprehend how the digital zoom region is changed. Accordingly, the enlargement region can be changed even on the enlarged display screen in consideration of the position, structure, disposition, and the like of the entire subject.

However, since the enlargement region is enlarged and displayed in the through image, the display of the through image is not changed in spite of the fact that the region to be digitally zoomed is changed. Here, when the user performs a release operation in this state, imaging is performed based on the changed digital zoom region.

When the instruction to change the digital zoom region is not input from the user via the input unit 19 in step S202, the process proceeds to step S204 (No in step S202). Next, when an instruction to change the position of an enlargement region is input from the user via the input unit 19 in step S204, the process proceeds to step S205 (Yes in step S204).

Then, in step S205, the display control unit 23 moves the enlargement region in response to the input of the user. As the result of the enlargement region, as shown in FIGS. 9A and 9B, the subject displayed in the through image is also changed.

FIG. 9A is a diagram illustrating the same display state as the display state shown in FIG. 7D and a case in which the through image is enlarged and displayed. When an instruction to move the enlargement region is input from the user in the state shown in FIG. 9A (an instruction of movement toward to the left in FIGS. 9A and 9B), the display control unit 23 moves the second small frame 221 in the indicator 230 to the left in accordance with an input movement amount, as shown in FIG. 9B.

As shown in FIG. 9B, the through image is moved to the left by the movement amount input by the user. In the second embodiment, the reduced image 240 of the non-digital zoom is included in the indicator 230, and thus the second frame showing the enlargement region is moved on the reduced image 240 with the movement of the enlargement region. Thus, the user can change the enlargement region in consideration of the position, structure, disposition, and the like of the entire subject, even when the enlargement region is enlarged and displayed as the through image.

In FIGS. 9A and 9B, the enlargement region has been moved to the left. However, the movement of the enlargement region to the left is merely an example. The enlargement region may be moved in any direction such as up, down, left, right, and oblique directions.

Figure 7:
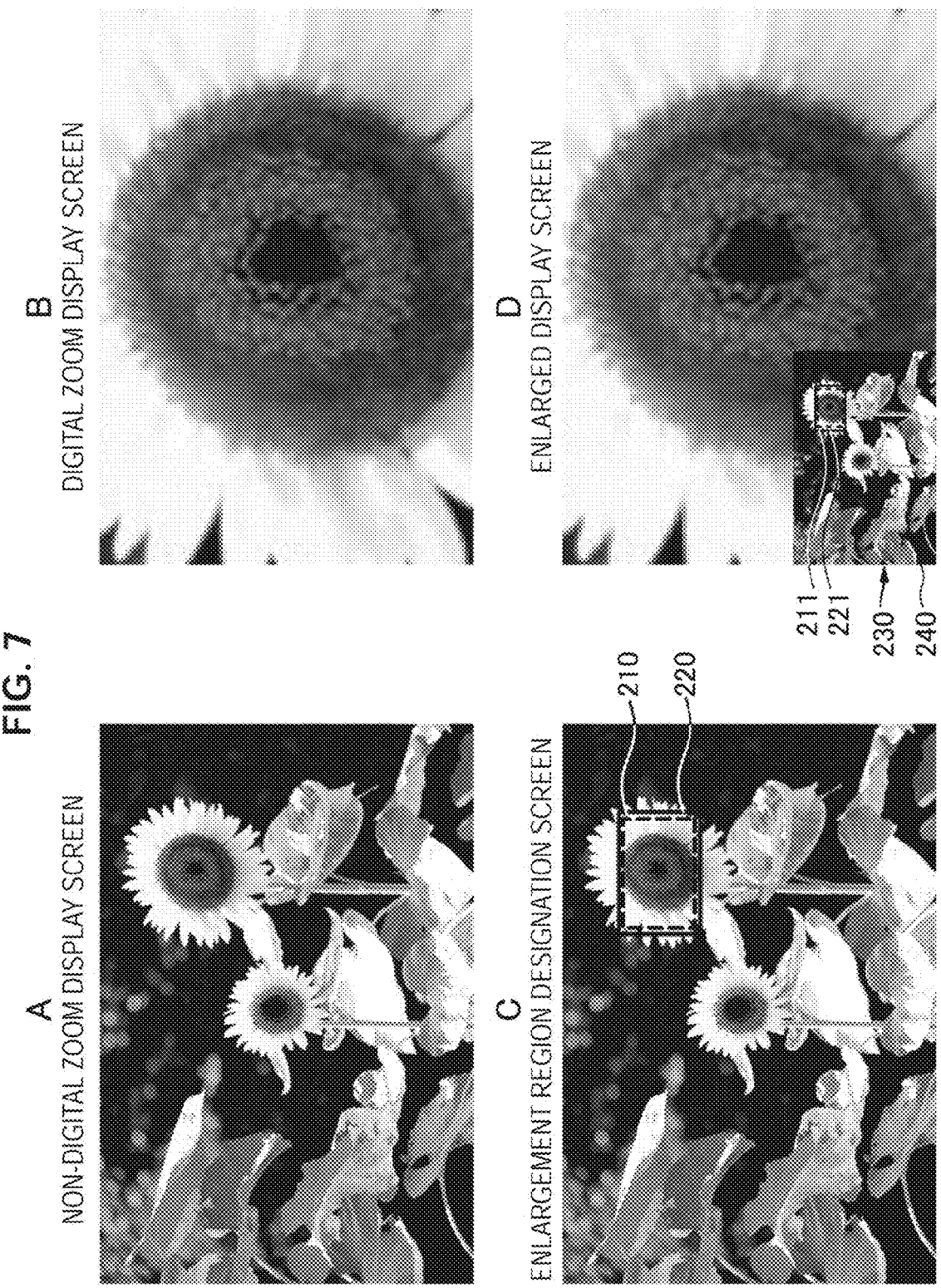
FIG. 7A is a diagram illustrating a non-digital zoom display screen of a specific example of the display control according to the second embodiment.
FIG. 7B is a diagram illustrating a digital zoom display screen.
FIG. 7C is a diagram illustrating an enlargement region designation screen.
FIG. 7D is a diagram illustrating an enlarged display screen.

The order of the process regarding the digital zoom in step S202 and step S203 and the process regarding the enlargement region in step S204 and step S205 is not limited to the order of the flowchart of FIG. 7. The process regarding the enlargement region may be first performed and both processes may be simultaneously performed in parallel.

Next, when the process proceeds to step S206 and determination of the enlargement region is input via the input unit 19, the imaging device on which the display control unit 23 is mounted performs imaging to acquire a captured image.

As in the first embodiment, the through image may return to the digital zoom display state after the input of the determination of the enlargement region and before the imaging so that the user can confirm the digital zoom state in the through image. In this case, the user performs the imaging by pressing down the shutter, after confirming the digital zoom state.

When an instruction to end the enlargement display is not input via the input unit 19 in step S206, the process proceeds to step S202 (No in step S206). Then, the processes from step S202 to step S206 are repeated until the instruction to end the enlargement display is input via the input unit 19. When the instruction to end the enlargement display is received from the user via the input unit 19, the process performed by the display control unit 23 ends (Yes in step S206).

Thus, in the second embodiment of the present technology, since the reduced image 240 of the image in the non-digital zoom state is superimposed and displayed on the enlarged display screen, the user can simultaneously comprehend the entire subject while performing a focus operation. Further, a region to be digitally zoomed can be changed even on the enlarged display screen. Thus, when the focal position is fixed, for example, the position of the image can be changed by changing the imageable angle of view.

Since the digital zoom region can be changed on a focus enlargement region designation screen and the enlarged display screen, the angle of view can be adjusted by changing the digital zoom region in the state in which the focus is achieved on the through image. Thus, for example, by selecting a composition at the macro-imaging time, the range of the user's imaging can be expected to be enlarged.

The processing function of the above-described display control apparatus can be realized by a computer. In this case, a program describing the processing contents of the function of the display control apparatus is provided. Then, by executing the program on a computer, the above-described processing function is realized on the computer. The program describing the processing contents can be recorded in a computer-readable recording medium such as an optical disc or a semiconductor memory.

When the program is distributed, for example, a portable recording medium such as an optical disc or a semiconductor memory recording the program is provided or sold. Further, the program may be stored in a server and the program may be provided via a network.

A computer executing the program stores the program recorded in, for example, a portable recording medium or the program transmitted from the server in a storage device of the computer. Then, the computer reads the program from the storage device of the computer and executes a process in accordance with the program. Further, the computer can also read the program directly from the portable recording medium and execute the process in accordance with the program. Furthermore, the computer can execute the program in accordance with the received program in order, whenever the program is transmitted from the server.

3. Modification Examples

It should be understood by those skilled in the art that various modifications, combinations, sub-combinations and alterations may occur depending on design requirements and other factors insofar as they are within the scope of the appended claims or the equivalents thereof.

In the above-described embodiments, the case in which the display control apparatus 1 is applied to an imaging device such as a digital still camera has been described, but the embodiments of the present technology can be also applied to other imaging devices. For example, the embodiments of the present technology can be applied to a digital video camera, a portable telephone having a camera function, a portable game device having a camera function, and the like.

The display control apparatus 1 can be applied to a so-called network camera system that includes a network camera and a reception terminal such as a personal computer receiving an image from the network camera via a network.

In this case, the reception terminal may have the function of the display control apparatus 1 and transmit a result of a region specifying process to the network camera. Further, the network camera may have the function of the display control apparatus 1 and transmit an image acquired by tracking a subject as a designation region to the reception terminal.

Additionally, the present technology may also be configured as below.

(1) A display control apparatus configured to perform display control in a manner that a first frame indicating a region to be digitally zoomed in an input image and a second frame indicating a region to be enlarged in the input image are superimposed on the input image.

(2) The display control apparatus according to (1), wherein an instruction to designate the region to be enlarged is received in a state in which the first and second frames are superimposed and displayed.

(3) The display control apparatus according to (2), wherein the region to be enlarged in the input image is displayed as an enlarged image when the instruction to designate the region to be enlarged is received.

(4) The display control apparatus according to (3), wherein control is performed in a manner that an indicator indicating a positional relation between the region to be digitally zoomed and the region to be enlarged is displayed in a state in which the enlarged image is displayed.

(5) The display control apparatus according to (4), wherein the indicator includes a first small frame corresponding to the first frame and a second small frame corresponding to the second frame.

(6) The display control apparatus according to (4) or (5), wherein control is performed in a manner that a reduced image obtained by reducing the input image is generated, the reduced image is superimposed on the enlarged image to be displayed, and the indicator is also superimposed on the reduced image to be displayed.

(7) The display control apparatus according to any one of (3) to (6), wherein an instruction to designate the region to be digitally zoomed is received in a state in which the enlarged image is displayed.

(8) The display control apparatus according to any one of (1) to (7), wherein an instruction to designate the region to be digitally zoomed is received in a state in which the first and second frames are superimposed and displayed.

(9) The display control apparatus according to any one of (1) to (8), wherein control is performed in a manner that the first and second frames are superimposed and displayed when an instruction of the enlargement is detected in a state in which a digitally zoomed image is displayed.

(10) The display control apparatus according to any one of (1) to (9), wherein the enlargement is enlargement for focus confirmation.

(11) The display control apparatus according to any one of (1) to (10), further including:
an imaging unit that images a subject.

(12) A display control method including
performing display control in a manner that a first frame indicating a region to be digitally zoomed in an input image and a second frame indicating a region to be enlarged in the input image are superimposed on the input image.

(13) A computer-readable recording medium having an image processing program recorded therein, the image processing program causing a computer to perform a display control method including performing display control in a manner that a first frame indicating a region to be digitally zoomed in an input image and a second frame indicating a region to be enlarged in the input image are superimposed on the input image.

The present technology contains subject matter related to that disclosed in Japanese Priority Patent Application JP 2012-038213 filed in the Japan Patent Office on Feb. 24, 2012, the entire content of which is hereby incorporated by reference.

What is claimed is:

1. A display control apparatus comprising:
at least one processor configured to perform display control at least in part by:
displaying, superimposed on an input image, a first frame indicating a first portion of the input image, wherein the first frame indicates a region of the input image to be zoomed;
displaying, superimposed on the input image, a second frame indicating a second portion of the input image, wherein the second frame indicates a region of the input image to be enlarged;
displaying an enlarged image corresponding to the second portion of the input image; and
displaying, superimposed on the enlarged image, an indicator indicating a positional relation between the first portion of the input image and the second portion of the input image, the indicator comprising a reduced image corresponding to a non-digital zoom state of the input image, a third frame corresponding to the first frame, and a fourth frame corresponding to the second frame.

2. The display control apparatus according to claim 1, wherein the at least one processor is configured to perform the display control at least in part by receiving a second instruction to designate the second portion of the input image in a state in which the first and second frames are superimposed and displayed.

3. The display control apparatus according to claim 2, wherein displaying the enlarged image corresponding to the second portion of the input image comprises displaying the enlarged image corresponding to the second portion of the input image after receiving the second instruction to designate the second portion of the input image.

4. The display control apparatus according to claim 1, wherein the at least one processor is configured to perform the display control at least in part by:
generating the reduced image by reducing the input image.

5. The display control apparatus according to claim 3, wherein the at least one processor is configured to perform the display control at least in part by receiving a third instruction to designate the first portion of the input image in a state in which the enlarged image is displayed.

6. The display control apparatus according to claim 1, wherein the at least one processor is configured to perform the display control at least in part by receiving a second instruction to designate the first portion of the input image in a state in which the first and second frames are superimposed and displayed.

7. The display control apparatus according to claim 1, wherein the at least one processor is configured to perform the display control at least in part by displaying, superimposed on the input image, the first and second frames after receiving a second instruction to enlarge the second portion of the input image in a state in which a digitally zoomed image is displayed.

8. The display control apparatus according to claim 1, wherein the at least one processor is configured to perform the display control at least in part by receiving a focus operation based on the enlarged image.

9. The display control apparatus according to claim 1, further comprising:
an image sensor configured to image a subject.

10. A display control method comprising:
performing, using at least one processor, display control at least in part by:
displaying, superimposed on an input image, a first frame indicating a first portion of the input image, wherein the first frame indicates a region of the input image to be zoomed;
displaying, superimposed on the input image, a second frame indicating a second portion of the input image, wherein the second frame indicates a region of the input image to be enlarged;
displaying an enlarged image corresponding to the second portion of the input image; and
displaying, superimposed on the enlarged image, an indicator indicating a positional relation between the first portion of the input image and the second portion of the input image, the indicator comprising a reduced image corresponding to a non-digital zoom state of the input image, a third frame corresponding to the first frame, and a fourth frame corresponding to the second frame.

11. A non-transitory computer-readable recording medium having processor-executable instructions recorded therein, the non-transitory computer-executable instructions causing at least one processor to perform a display control method including:
performing display control at least in part by:
displaying, superimposed on an input image, a first frame indicating a first portion of the input image, wherein the first frame indicates a region of the input image to be zoomed;
displaying, superimposed on the input image, a second frame indicating a second portion of the input image, wherein the second frame indicates a region of the input image to be enlarged;
displaying an enlarged image corresponding to the second portion of the input image; and
displaying, superimposed on the enlarged image, an indicator indicating a positional relation between the first portion of the input image and the second portion of the input image, the indicator comprising a reduced image corresponding to a non-digital zoom state of the input image, a third frame corresponding to the first frame, and a fourth frame corresponding to the second frame.

* * * * *